(12) United States Patent
Geiger

(10) Patent No.: US 9,658,109 B2
(45) Date of Patent: May 23, 2017

(54) NON-CONTACT THERMAL SENSOR MODULE

(71) Applicant: Heptagon Micro Optics Pte. Ltd., Singapore (SG)

(72) Inventor: Jens Geiger, Thalwil (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 0 days.

(21) Appl. No.: 14/774,533

(22) PCT Filed: Mar. 12, 2014

(86) PCT No.: PCT/SG2014/000117
§ 371 (c)(1),
(2) Date: Sep. 10, 2015

(87) PCT Pub. No.: WO2014/142750
PCT Pub. Date: Sep. 18, 2014

(65) Prior Publication Data
US 2016/0041038 A1 Feb. 11, 2016

Related U.S. Application Data

(60) Provisional application No. 61/788,478, filed on Mar. 15, 2013.

(51) Int. Cl.
*G01J 5/00* (2006.01)
*G01J 5/08* (2006.01)
(Continued)

(52) U.S. Cl.
CPC ........... *G01J 5/0806* (2013.01); *G01J 5/0215* (2013.01); *G01J 5/04* (2013.01); *G01J 5/046* (2013.01);
(Continued)

(58) Field of Classification Search
CPC .............. H01L 31/0203; H01L 31/0232; G01J 2005/068; G01J 5/06; G01J 5/08
(Continued)

(56) References Cited

U.S. PATENT DOCUMENTS 4,636,091 A * 1/1987 Pompei .................... G01J 5/02
250/342
5,473,368 A * 12/1995 Hart ................... G08B 13/1963
348/155
(Continued)

FOREIGN PATENT DOCUMENTS

| WO | 2007/042081 A1 | 4/2007 |
| WO | 2009/076789 A1 | 6/2009 |
| WO | 2011/156926 A1 | 12/2011 |

OTHER PUBLICATIONS

Australian Patent Office, International Search Report and the Written Opinion for International Patent Application No. PCT/SG2014/000117, May 16, 2016 (9 pages).
(Continued)

*Primary Examiner* — David J Makiya
*Assistant Examiner* — Kenneth J Malkowski
(74) *Attorney, Agent, or Firm* — Fish & Richardson P.C.

(57) ABSTRACT

Compact thermal sensor modules, which in some implementations can be manufactured in wafer-level fabrication processes, include features composed of or coated with a low-emissivity material to reduce or prevent detection by a sensor of radiation emitted by other parts of the module. For example, spacers that separate an optics substrate and a sensor package from one another can be composed of or coated with such a low emissivity material. In some cases, the low emissivity material has an emissivity of no more than 0.1.

14 Claims, 8 Drawing Sheets

(51) Int. Cl.
*G01J 5/04* (2006.01)
*G01J 5/02* (2006.01)
*G01J 5/06* (2006.01)
*G01J 5/10* (2006.01)

(52) U.S. Cl.
CPC ............... *G01J 5/06* (2013.01); *G01J 5/0815* (2013.01); *G01J 5/10* (2013.01)

(58) Field of Classification Search
USPC ...................................................... 250/338.3
See application file for complete search history.

(56) References Cited

U.S. PATENT DOCUMENTS

| | | | | |
|---|---|---|---|---|
| 8,071,947 | B2 * | 12/2011 | Garman | G01J 5/06 250/352 |
| 2004/0057493 | A1 | 3/2004 | Ishikawa et al. | |
| 2004/0066832 | A1 | 4/2004 | Lin et al. | |
| 2011/0228811 | A1 | 9/2011 | Fraden | |
| 2012/0184252 | A1 | 7/2012 | Hirsch | |
| 2013/0019461 | A1 | 1/2013 | Rudmann et al. | |

OTHER PUBLICATIONS

MLX90615, *Infra Red Thermometer*, Data Sheet, Aug. 30, 2012; 32 pages.

"Infrared Thermopile Sensor in Chip-Scale Package," Production Data, Texas Instruments, TMP006, TMP006B, May 2011, Revised Dec. 2012 (19 pages).

SMD Thermopile Sensor With Integrated Processing for Non-Contact Temperature Measurement, Thermopile sensors and modules, www.perkinelmer.com, pp. 38-39. Undated.

"For a Healthier, Cleaner & Safer Tomorrow", Infrared Sensing, www.perkinelmer.com (46 pages). Undated.

"Technology—and Marketleader for Infrared Thermopile Sensors", www.heimannsensor.com, downloaded Feb. 26, 2013 (2 pages).

Omron MEMS thermal area sensor http://www.youtube.com/watch?v=2m4PmZRx-U&noredirect=1, downloaded Feb. 26, 2013 (1 page).

Omron D6T MEMS Thermal Sensors, http://www.omron.com/ecb/products/sensor/11/d6t.html, downloaded Feb. 26, 2013 (5 pages).

* cited by examiner

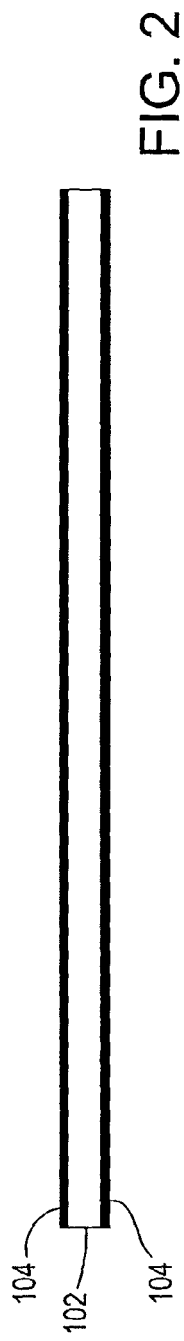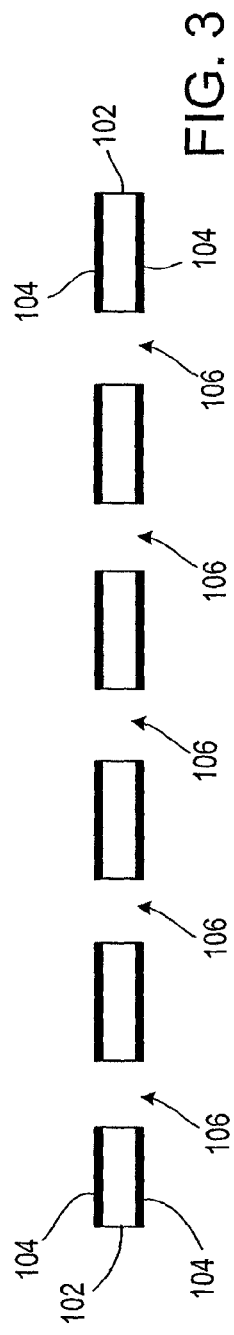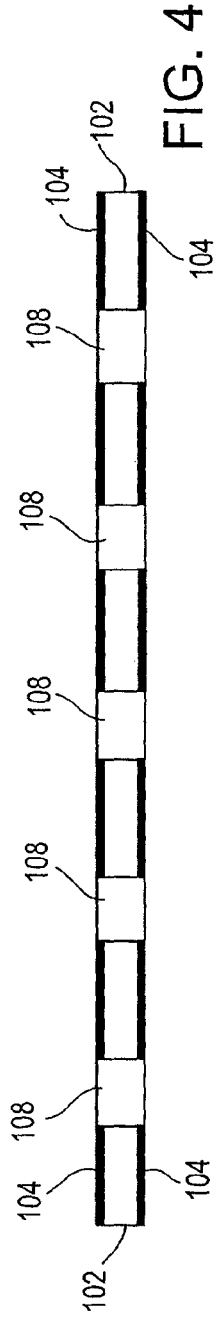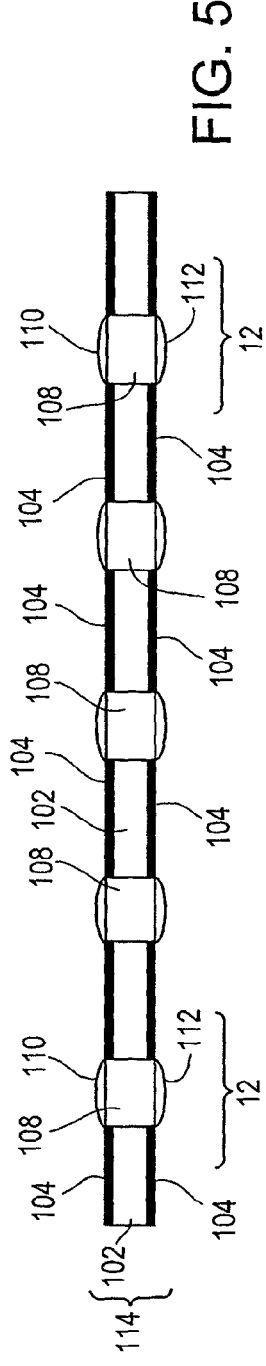

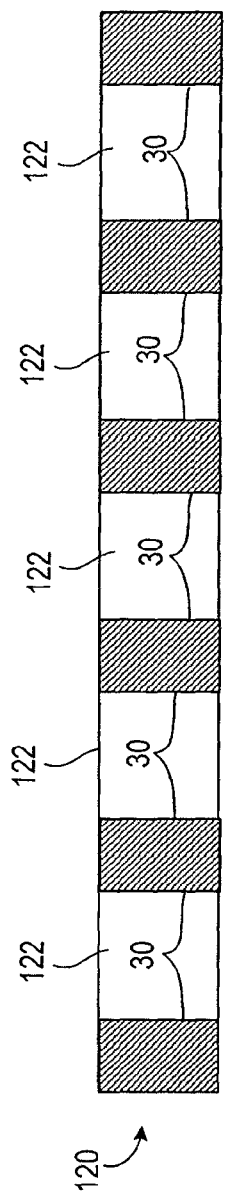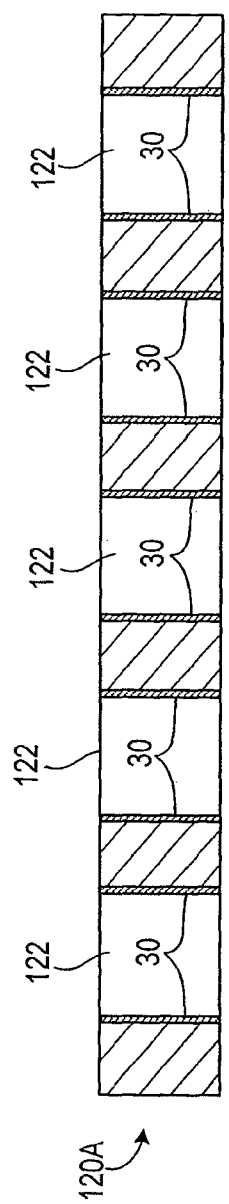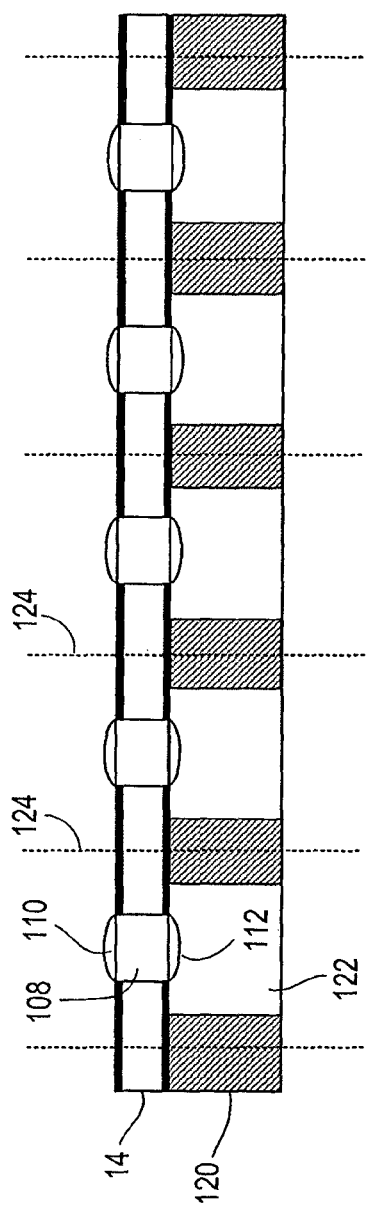

NON-CONTACT THERMAL SENSOR MODULE

FIELD OF THE DISCLOSURE

This disclosure relates to non-contact thermal sensor modules.

BACKGROUND

Non-contact thermal sensors are used in a wide range of applications and can be used to detect the temperature of an object without coming into contact with the object. Such sensors sometimes are integrated into consumer electronic products or other electronic devices. Mobile or hand-held phones, for example, can include a non-contact thermal sensor and allow a user to point the sensor at an object whose temperature is to be measured. In some cases, the measured temperature information may be combined with a camera image recorded by the device for display on the device.

Non-contact thermal sensors typically sense infra-red (IR) radiation, which presents various challenges. For example, to detect and record only the temperature of the object of interest, the thermal sensor should be insulated from IR radiation emitted by other materials in the vicinity of the sensor.

Other challenges relate to inefficiencies in manufacturing processes, particularly in connection with thermal sensor modules that need to have relatively small dimensions and for which high-volume production is desirable (e.g., thermal sensor modules for integration with hand-held, mobile phones).

SUMMARY

The present disclosure describes compact thermal sensing modules, which in some implementations can be manufactured in wafer-level fabrication processes and which include low-emissivity material to reduce or prevent detection by the sensor of radiation emitted by other parts of the module. The described techniques can, therefore, help insulate the thermal sensor from IR radiation emitted, for example, by other parts of the module and thereby increase the accuracy of the temperature measurement of an intended object (e.g., an object at which the sensor is aimed).

For example, in one aspect, a non-contact thermal sensor module includes an optics substrate, wherein at least a portion of the optics substrate is transparent to infra-red radiation and includes at least one optical element thereon. The module also includes a sensor package, which includes a thermal sensor, and a spacer separating the optics substrate and the sensor package from one another. The spacer provides sidewalls for the module, where the sidewalls having an inner surface facing an interior region of the module. The spacer is composed of, or coated with, a low emissivity material having an emissivity of no more than 0.1.

One or more of the following features are present in some implementations. For example, a surface of the optics substrate facing the interior region of the module can be coated with a low emissivity material having an emissivity of no more than 0.1. The low emissivity material can be composed, for example, of one or more metals selected from a group consisting of copper, aluminum, gold, nickel, titanium and tungsten. In addition, some of the metals can have an protective layer to prevent oxidation.

According to another aspect, a non-contact thermal sensor module includes first and second optics substrates on each of which is a respective optical element, and a sensor package, which includes a thermal sensor. A first spacer separates the first optics substrate and the second optics substrate from one another, and a second spacer separates the second optics substrate and the sensor package from one another. The first and second spacers have inner surfaces facing an interior region of the module. The first optics substrate is transparent to infra-red radiation, the second optics substrate has an aperture substantially aligned with the thermal sensor, and the first and second spacers are composed of, or coated with, a low emissivity material having an emissivity of no more than 0.1.

In some implementations, the module includes telescope-type optical elements. The optical element on the first optics substrate can be, for example, a lens that faces the interior region of the module. The optical element on the second optics substrate can include a curved, reflective surface facing the lens, wherein the curved reflective surface is coated with a metal material. The low emissivity material for the spacers and/or the coatings can be composed, for example, of one or more metals selected from a group consisting of copper, gold, aluminum, nickel, titanium and tungsten.

This disclosure also describes a device that includes a printed circuit board and a non-contact thermal sensor module mounted to the printed circuit board. The thermal sensor module can include various features (e.g., a spacer) composed of, or coated with, a low emissivity material having an emissivity of no more than 0.1.

In some implementations, the low emissivity material may be significantly lower than 0.1 (e.g., 0.05 or 0.02).

Other aspects, features and advantages will be readily apparent from the following detailed description, the accompanying drawings and the claims.

BRIEF DESCRIPTION OF THE DRAWINGS

FIGS. 2 through 5 illustrate steps in a wafer-level process for fabricating multiple optics parts of the modules.

FIGS. 6A and 6B illustrate examples of spacer wafers.

FIG. 7 illustrates a wafer stack including an optics wafer and a spacer wafer.

DETAILED DESCRIPTION

Figure 1:
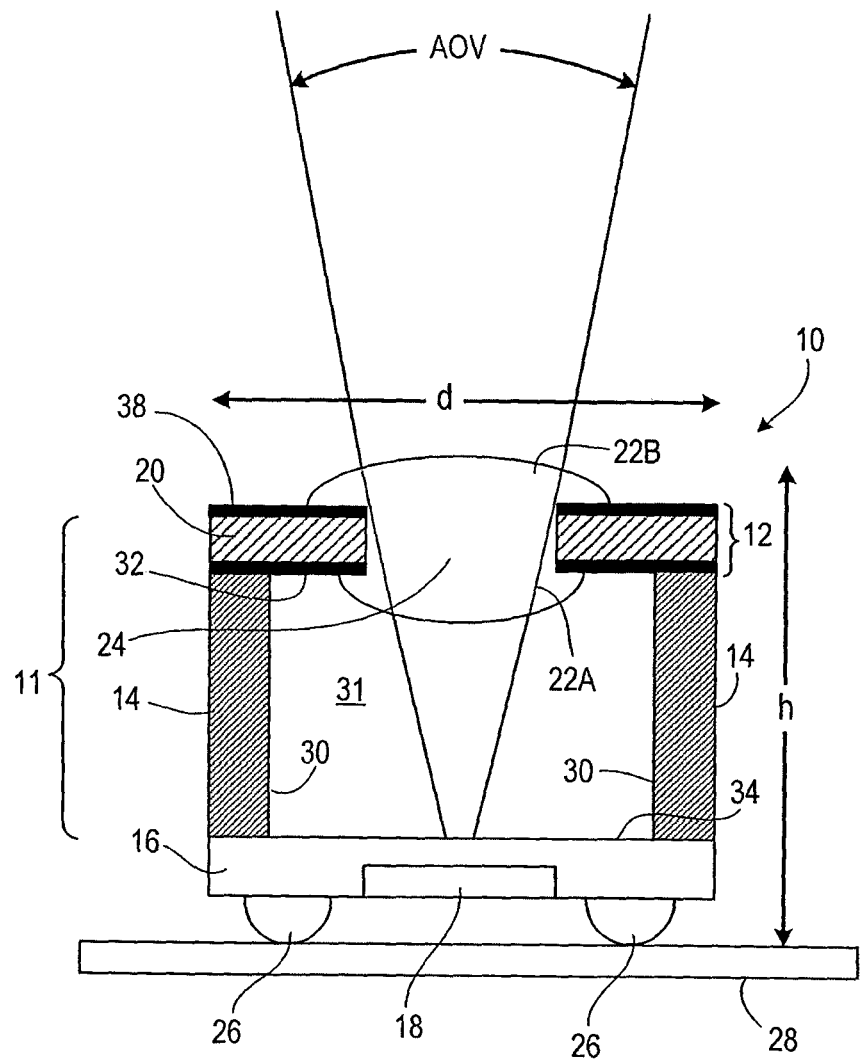
FIG. 1 illustrates an example of a non-contact thermal sensor module.

As illustrated in FIG. 1, a non-contact thermal sensor module 10 includes an optics part 12 that serves as a cover for the module, a spacer part 14 and a sensor package 16. The combination of optics part 12 and spacer part 14 forms an optical module 11 to which sensor package 16 is attached. Spacer part 14 separates optics part 12 from sensor package 16 and maintains a predetermined axial distance between the optics part and the sensor package.

As shown in the example of FIG. 1, sensor package 16 includes a thermal sensor 18 that detects IR radiation.

Examples of such thermal sensors include pyrometers such as pyroelectric sensors that convert IR radiation to a corresponding voltage, photodiodes that convert IR photons to a corresponding voltage, thermopiles or thermocouplers that convert a local temperature difference to a corresponding voltage, and bolometers that convert a local temperature to a corresponding resistance. For example, pyroelectric sensors use a pyroelectric material to generate energy when exposed to heat and, thus, detect changes in IR radiation. The detected changes can be converted by the sensor to a corresponding temperature. Examples of pyroelectric materials include gallium nitride (GaN) or other semiconductor materials, cesium nitrate ($CaNO_3$), polyvinyl fluorides, derivatives of phenylpyrazine, and cobalt phthalocyanine. In some implementations, a bolometric sensor is used as the thermal sensor. In such sensors, the electrical resistance, for example, of vanadium oxide is changed by incident IR radiation. The change in electrical resistance can be converted to a corresponding temperature.

The underside of sensor package 16 can include external conductive contacts 26 such as solder balls or SMT pads, which can be connected electrically to conductive lines on a printed circuit board (PCB) 28.

Optics part 12 includes an optics substrate 20 (which also can be referred to as a lens substrate), at least a central portion 24 of which is composed of a transparent material (i.e., one that allows IR radiation to pass through). The remainder of optics substrate 20 can be composed, for example, of printed circuit board (PCB) material such as FR4, which is a grade designation assigned to glass-reinforced epoxy laminate material. In some implementations, optics substrate 20 is composed of material that is transparent to IR radiation (e.g, silicon, germanium, GaAs, KBr, $CaF_2$). One or more lens elements are attached to optics substrate 20 such that they are aligned with central transparent portion 24 as well as sensor 18. In the illustrated example, a first lens element 22A is provided at the lower surface 32 of optics substrate 20, and a second lens element 22B is provided at the upper surface 38 of optics substrate 20. Lens elements 22A, 22B can be replicated elements composed, for example, of a ultra-violet (UV)-cured epoxy. Lens elements 22A, 22B can have, for example, a spherical or aspherical shape. In particular, lenses 22A, 22B can be Fresnel-type lenses so as to reduce absorption in the lens material. Lens elements 22A, 22B help focus IR radiation from an external object toward sensor 18. In other implementations, optics substrate 20 and lenses 22A, 22B can be made of the same material and produced by a molding process or by lithography or etching. Such a process can be used to produce a complete wafer (e.g., 8-inch diameter) at one time with hundreds or thousands of micro-lenses on its surface.

Spacer part 14, which can be attached to optics part 12, has an inner side surface 30 extending between the bottom surface 32 of optics substrate 20 and the top surface of sensor package 34. Inner side surface 30, which can have a cylindrical, parallel-piped or other shape, generally runs perpendicular to lower surface 32 of optics substrate 20 and top surface 34 of sensor package 16. As shown in the example of FIG. 1, lower surface 32 of optics substrate 20, inner side surface 30 of spacer part 14 and top surface 34 of sensor package 16 define an inner area 31 that serves as a channel for incoming radiation. Spacer 14 also forms side walls of the module 10. Spacer part 14 can be made of a single piece and can comprise a generally flat body with a planar front (i.e. top) surface and a planar rear (i.e., bottom) surface, which acts as a reference or abutment surface for sensor package 16.

A closed cavity 31 is formed by spacer part 14 in combination with optics part 12 and sensor package 16. Cavity 31 can protect optical element 22A from environmental influences during manufacture and use, and can shield sensor 18 from ambient infrared radiation.

In order to reduce detection by sensor 18 of radiation emitted by the materials that form part of module 10, one or more portions of module 10 are composed of, or coated with, a low emissivity material, where a material's emissivity indicates the relative ability of the material's surface to emit energy by radiation compared to an ideal black body. The emissivity can take a value between 0 and 1. Preferably, the maximum emissivity is about 0.1. Examples of low emissivity materials include metals such as copper (Cu), aluminum (Al), gold (Au), nickel (Ni), titanium (Ti) and tungsten (W), particularly such metals having a polished or blank surface. For example, at a temperature of about 25 C.°, polished Cu, Al, Au and Ni have emissivity values of about 0.05.

In some implementations, lower surface 32 of optics substrate 20 is coated with a low emissivity material, except on the area of central transparent portion 24. Upper surface 38 of optics substrate 20 also can be coated with a low emissivity material, except in the vicinity of central transparent portion 24.

In addition, as shown in FIG. 1, spacer part 14 can be composed of a low emissivity material in its entirety or its inner side surface 30 can be coated with a low emissivity material. The low emissivity coating on surface 30 can be added, for example, after assembly of optics part 12 and spacer 14 to form a continuous surface. In other implementations, the two parts 12, 14 can be metalized first, in which case, attachment of the two parts can be done by a standard process if care is taken to reduce the ingress of glue into the cavity. Alternatively, an interface material can be chosen that has low emissivity (e.g., gold-tin solder). In yet other implementations, the two parts 12, 14 can be connected by a process that does not require extra material (e.g., bonding, welding). If the low emissivity material is conductive, then it also can act as an electro-magnetic shield. In such cases, coating of components 12, 14 and 16 should be electrically connected to the shielding of sensor 18 or to a common electrical ground.

Although the dimensions of the module 10 can vary depending on the particular application, in some cases the overall dimensions (e.g., lateral diameter and height) are on the order of just a few millimeters (mm), for example 5 mm or less. In some implementations, each of the lateral diameter (d) and the height (h) may be as little 2 mm or less. The lateral dimensions of sensor 18 as well as the radius of the aperture defined by central transparent portion 24 can be on the order of 0.5 mm or less. In a particular example, the module's angle of view (AOV) is less than 30° (e.g., about 28°). Thus, a miniaturized non-contact thermal sensor can be achieved (e.g., for spot temperature measurements).

Multiple optical modules 10 can be fabricated, for example, in a wafer-level process. In this context, a wafer refers to a substantially disk- or plate-like shaped item, its extension in one direction (z-direction or vertical direction) is small with respect to its extension in the other two directions (x- and y-directions or lateral directions). On a (non-blank) wafer, a plurality of similar structures or items can be arranged, or provided therein, for example, on a rectangular grid. A wafer can have openings or holes, and in some cases a wafer may be free of material in a predominant portion of its lateral area. Depending on the implementation, a wafer may be made, for example, of a semiconductor material, a polymer material, a composite material comprising metals and polymers or polymers and glass materials. In particular, the wafers may comprise hardenable materials such as a thermally or UV-curable polymers. In some implementations, the diameter of a wafer is between 5 cm and 40 cm, and can be, for example between 10 cm and 31 cm. The wafer may be cylindrical with a diameter, for example, of 2, 4, 6, 8 or 12 inches, one inch being about 2.54 cm. The wafer thickness can be, for example, between 0.2 mm and 10 mm, and in some cases, is between 0.4 mm and 6 mm.

FIGS. 2 thorough 5 illustrate a method for fabricating optics parts 12 in a wafer-level process. An optics substrate wafer 102, composed for example of a PCB material such as FR4 is coated one or both sides with a low emissivity material 104 (see FIG. 2). Next, through-holes 106 are formed at specified locations in optics substrate wafer 102 (see FIG. 3). The locations of through-holes 106 correspond to the locations for central transparent portions 24 of optics substrates 20. Through-holes 106 can be formed, for example, by micromachining, which may include milling, drilling, laser ablation, etching and/or photolithography. In other implementations, an optics substrate wafer is formed with through-holes using a replication technique. Through-holes 106 then are filled with a transparent material such as a transparent polymer (e.g., epoxy, acrylate, polyurethane, or silicone) to form transparent apertures 108 (see FIG. 4). Optical elements 110, 112 (e.g., lenses) are formed, for example, by a replication process such that the each aperture 108 and its associated optical elements 110, 112 lie on substantially the same axis (see FIG. 5). In some implementations, optical elements 110, 112 are coated with a reflective material.

The process illustrated by FIGS. 2 through 5 results in an optics wafer 114 that includes multiple optics parts 12 arranged side-by-side (e.g., in a M×N array), where each optics part 12 includes one or more optical elements 110, 112 aligned with a respective aperture 108. The upper and lower surfaces of optics wafer 114 (other than on apertures 108 and optical elements 110, 112) are covered with low emissivity coating 104.

FIG. 6A illustrates an example of a spacer wafer 120, which has a multitude of through-holes 122 whose inner side surfaces 30 are composed of a low emissivity material (e.g., Cu, Al, Au or Ni). Through-holes 122 can be formed, for example, by drilling, micromachining or replication techniques. The spacer wafer can be composed entirely of the low emissivity material, as in the example of FIG. 6A. Alternatively, the spacer wafer can be composed of some other material (e.g., a transparent or non-transparent UV-curable polymer such as epoxy, acrylate, polyurethane, silicone or PCB material) with a low emissivity material coating on the inner side surfaces 30. An example of such a spacer wafer 120A is illustrated in FIG. 6B. The low emissivity coating can be applied, for example, using a deposition, sputtering, evaporation or ion beam technique.

As shown in FIG. 7, optics wafer 114 is attached to spacer wafer 120 (or 120A) to form a wafer stack. Optical elements 112 on the underside of the respective transparent apertures 108 are located within a respective one of the through-holes 122 of spacer wafer 120 (or 120A). Optics wafer 114 and spacer wafer 120 (or 120A) can be held together, for example, by an adhesive. The wafer stack then can be separated (e.g., diced) along lines 124 to form individual optical modules.

Figure 8:
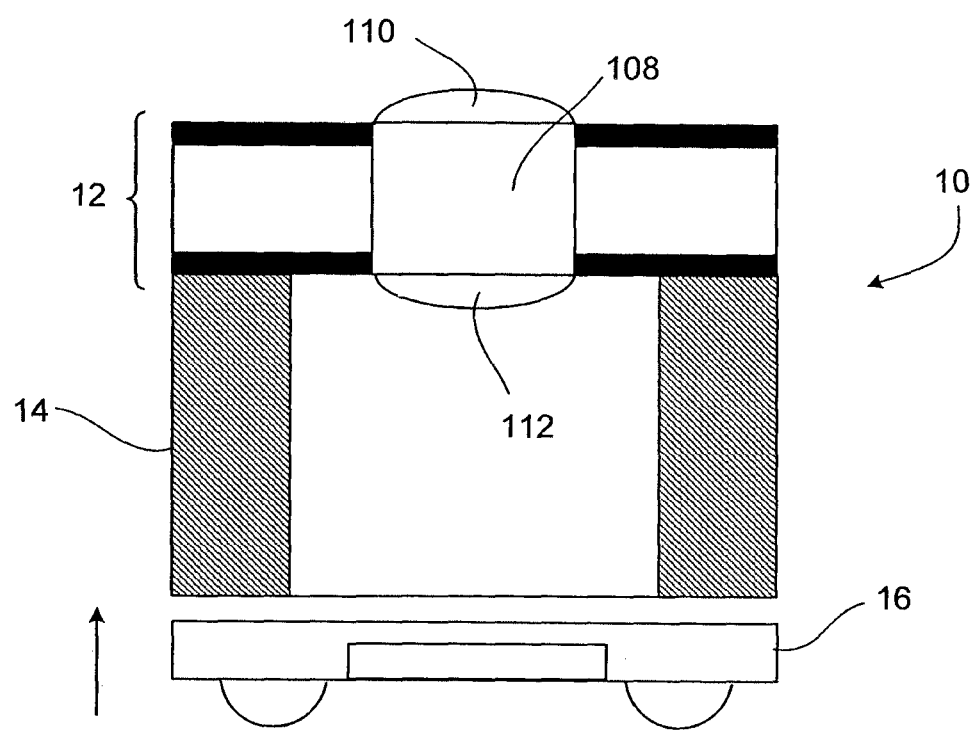
FIG. 8 illustrates an example of a thermal sensor package being attached to an optics module.

As shown in FIG. 8, a thermal sensor package 16 is attached to the bottom of each optical module (i.e., at the bottom of spacer part 14) to form a non-contact thermal sensor module 10. Sensor package 14 can be attached to the bottom of spacer part 14, for example, using an adhesive. Attachment of the sensor also can be done in a wafer-level process similar to the steps described above for the spacer and lens wafers.

Figure 9:
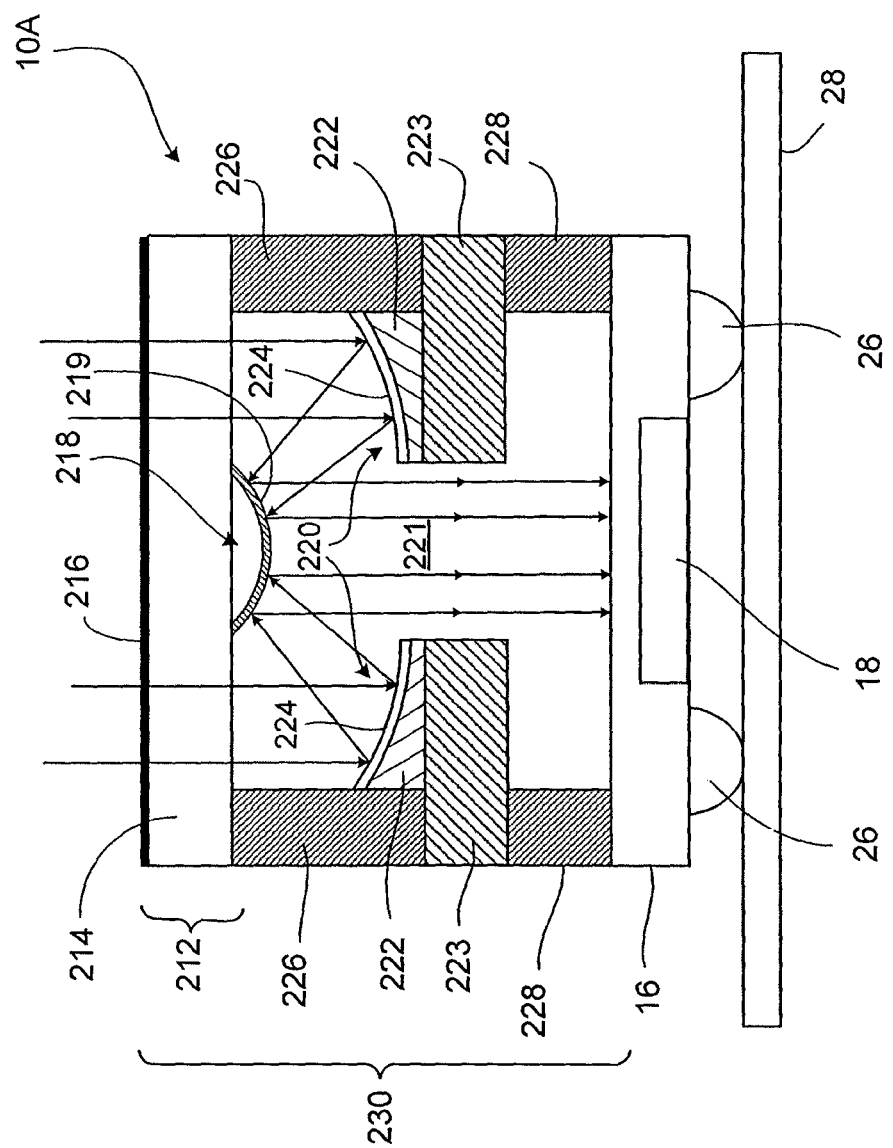
FIG. 9 illustrates another example of a thermal sensor module.

FIG. 9 illustrates another example of a non-contact thermal sensor module WA, in which telescope-type optical elements are used. This module has the advantage that, in some implementations, more light can be collected and a smaller angle of view (AOV) can be provided. The reason is that the telescope-type arrangement facilitates a larger focal length of the optical system for a given module height (e.g., the focal length can be two to ten times the mechanical height of module 230). Module 10A has a first optics part 212 including an IR transmissive substrate in the form of a plate 214 that serves as a cover for the module. IR transmissive plate 214 is composed, for example of an IR transmissive material such as Si, Ge, ZnS or ZnSe. An anti-reflective, anti-scratch coating 216 can be provided on the upper (i.e., outer) surface of plate 214. Parts of surface 216 may also be covered with a low emissivity coating (e.g., a metal coating) to form the aperture of the optical system or to control stray light that enters the optical system. An optical element (e.g., a mirror) 218 is attached to the underside of plate 214 and can be formed, for example, by a replication technique and can be coated by a low emissivity, highly reflective material 219. The telescope can be symmetrical (as shown in FIG. 9) or asymmetrical (as in the case of an off-axis telescope). For a symmetrical telescope, common design principles can be applied (e.g., those of a Ritchey-Chrétien-telescope).

A second optics part 220 includes curved, reflective mirrors 222 on a second optics substrate 223, which has an aperture (i.e., an opening) 221 that is aligned with optical element 218 and thermal sensor 18. Reflective mirrors 222 can be formed, for example, by a replication technique. The upper surfaces of reflective mirrors 222 can be covered with a low-emissivity, highly reflective coating 224 to enhance their reflectivity. The various components are stacked one upon the other such that second optics part 220 is disposed between plate 214 and sensor package 16. A first spacer part 226 separates first optics part 212 and second optics part 220, whereas a second spacer part 228 separates second optics part 220 and sensor package 16. Spacer parts 226, 228 can be composed of a low emissivity material (e.g., Cu, Al, Ni) as described above. In addition, optics substrate 223 can be made of or covered with a low emissivity material. The coating can extend on both of the sides of substrate 223 that are exposed to the inner surface of the cavity and can even extend to form a continuous surface with coating 224. In some implementations, one or both of spacer parts 226, 228 can be composed of some other material (e.g., a transparent or non-transparent UV-curable polymer such as epoxy, acrylate, polyurethane, or silicone) with a low emissivity material coating on their inner side surfaces.

The combination of optics part 212 and spacer parts 226, 228 forms an optical module 230 to which sensor package 16 is attached. Multiple optical modules 230 can be fabricated, for example, in a wafer-level process. The telescope can be symmetrical (as shown in FIG. 9) or asymmetrical (as in the case of an off-axis telescope). For a symmetrical telescope, common design principles can be applied (e.g., those of a Ritchey-Chrétien-telescope).

In use, IR radiation enters through plate 214. Portions of the radiation may fall on mirror surfaces 222 and be reflected back toward first optics part 212, which reflects the radiation (or at least a portion of the radiation) back toward sensor 18. The arrangements of FIGS. 1 and 9 can be combined to provide a module that has a lens-like element on a first wafer and below that, on a second or third wafer, telescope-like elements. Such a combination of elements can provide better image quality in the event that sensor 18 is not a single pixel element, but an array of pixels to provide a thermal image.

Figure 10:
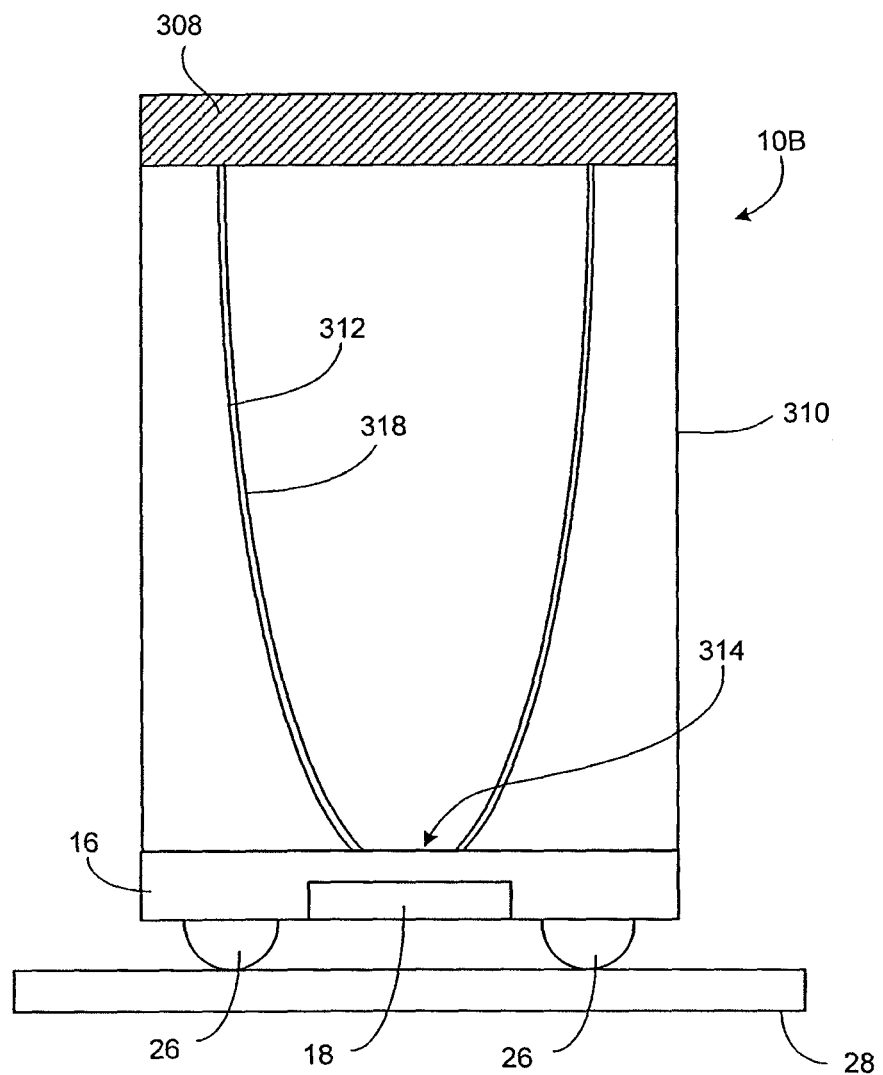
FIG. 10 illustrates yet another example of a thermal sensor module.

FIG. 10 illustrates an example of a non-imaging version of a sensor module 10B that includes an IR transmissive plate 308 that serves as a cover for the module. Plate 308 can be composed, for example of an IR transmissive material such as Si, Ge, ZnS or ZnSe. Instead of replicating lenses on plate 308, the inner wall 312 of the spacer 310 has a curved (e.g., parabolic) shape and is coated with a highly reflective, low emissivity material (e.g., a metal like copper, gold, aluminum, nickel, titanium or tungsten) 318. The low emissivity material 318 can have an emissivity, for example, of 0.1 or less (e.g., 0.05 or 0.02). An opening 314 at the sensor side is adapted to the size of sensor 18 and precisely aligned to it. The shape and the height of the parabola forming the inner wall 312 of spacer 310 can be optimized for a desired angle of view. Radiation impinging on the parabolic-shaped inner surface can be reflected through opening 314 to sensor 18. A non-imaging sensor can be used when a specific focal plane and the distinction of single object is disadvantageous for the specific application (e.g., when the thermal radiation coming from a narrow angle (e.g., 20° or less) needs to be detected).

Figure 11:
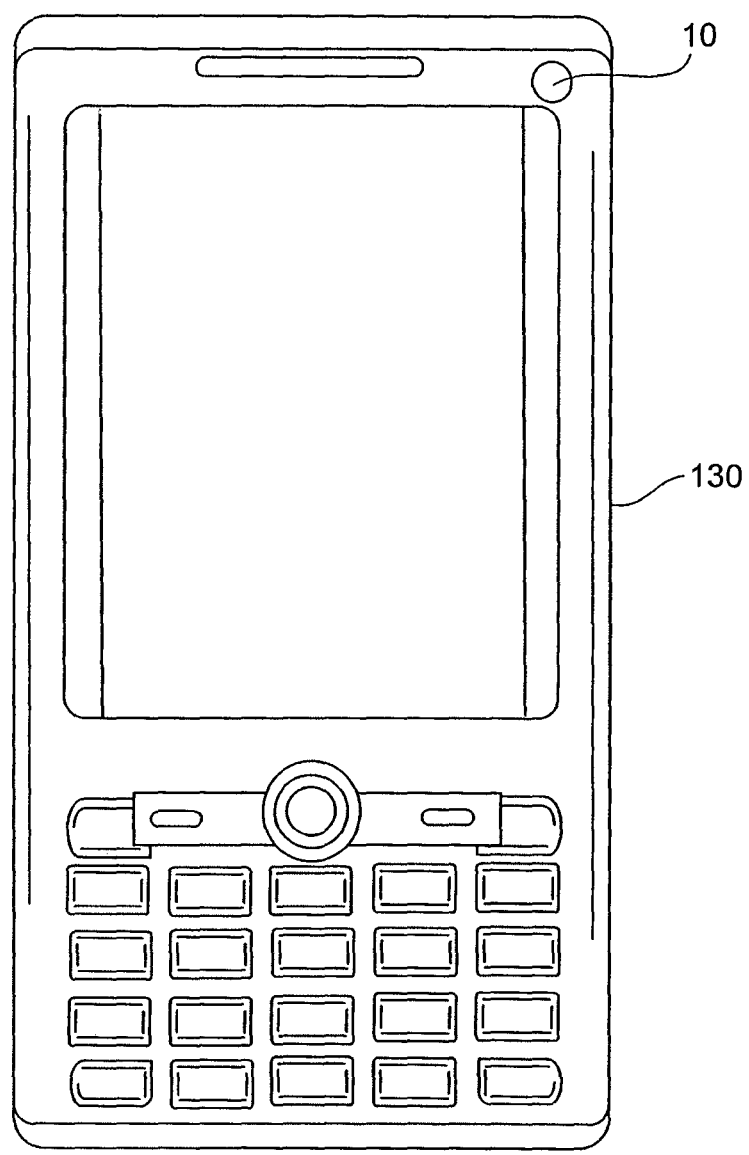
FIG. 11 illustrates an example of a device including an integrated thermal sensor module.

The thermal sensor module 10 (or 10A or 10B) can be integrated, for example, into an electronic device such as a mobile phone 130 having a transparent window over module 10 (or 10A or 10B) to allow the temperature of an object to be measured by using the module to sense IR radiation emitted by the object of interest (see FIG. 11). In some implementations, the measured temperature information may be combined with a camera image recorded by the mobile phone or other device for display on the device. The thermal sensor module can be electrically connected to a printed circuit board (see FIGS. 1, 9 and 10) for connection to other components in the device.

In other applications, the thermal sensor modules 10 (or 10A) can be integrated into medical devices.

To calculate the temperature of an object based on the thermal radiation that the object emits and that is received by a thermal sensor as described above, the emissivity of the object needs to be known. Furthermore, the accuracy of the calculated temperature depends on how precisely the emissivity of the object is known. For many materials, the emissivity is a characteristic property that changers very little under different environmental conditions. Thus, a database that stores common materials and their emissivity can be established. In some thermal cameras, the emissivity can be set to a constant value by the user. If such a camera acquires a thermal image of different objects, the temperature of the different objects will be calculated using the same emissivity. If the objects are composed of different materials with different emissivities, the calculated temperature will be somewhat inaccurate. As the camera calculates the temperature using constant emissivity for all materials recorded, the temperature information might be inaccurate. In order to improve the quality of the collected temperature information, the camera of a mobile communication device can be used. As described below, various approaches are possible.

First, the camera can be used to distinguish between "subjects" and "objects" (e.g., using facial recognition software). Once a certain area in a picture is recognized as a human subject, emissivity information for human skin (~0.98) can be used in order to provide more accurate temperature information. Examples of applications include measuring the temperature of a person in case of fever or hypothermia. Using advanced software, the camera can be used to recognize the objects in the scene by the shape, color and/or temporal change in shape or color and/or location. By accessing local information or remote databases through telecommunication networks, the mobile device can apply the suitable emissivity values for the different objects in the image to calculate the temperature.

Figure 12:
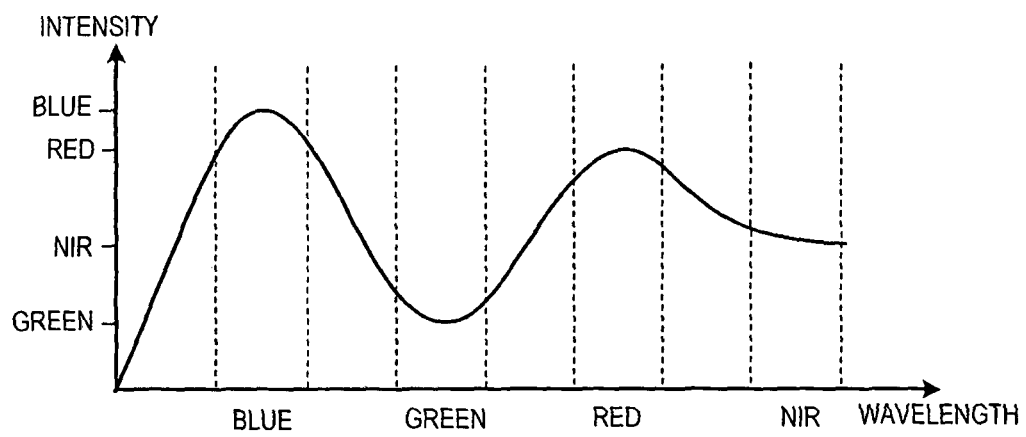
FIG. 12 illustrates an example of recorded optical spectrum information of an object.

In a second approach, the camera can be used to perform a spectral analysis of the objects in the image in the visible (e.g., 380 nm-750 nm) and IR (e.g., 750 nm-3,000 nm) wavelength ranges. For objects that have a specific spectral signature, a suitable emissivity can be obtained from local information or remote databases through telecommunication networks to calculate the temperature accurately. The more spectral information collected and stored, the more accurately the material of the object of interest can be identified. A typical camera uses a sensor that measures three wavelength ranges (i.e., blue, green and red). Color filters on this sensor may be optimized to give more accurate spectral information. New wavelength ranges can be added at the blue end or the red end of the spectrum by adding extra sub-pixels to the sensor. For example, one of the four sub-pixels on a standard detector may be equipped with a filter that permits light in the range between 750 and 1100 nm, or a part of that range, to pass. This range is of special interest as silicon detectors are naturally sensitive in this range. The measurement principle is depicted in FIG. 12. A random spectrum of an object is drawn as intensity over wavelength. In this example the sensor of the camera of the mobile device is sensitive to four wavelength ranges —, blue, green, red and near infrared (NIR). In each wavelength band, the spectrum of the object evaluates to an intensity value as marked on the intensity axis. This group of intensity values, especially their relative values, is a fingerprint for the material of the object. This fingerprint becomes more accurate as the number of wavelength channels the camera can detect increases and as wavelength bands become more narrow. Once the object is identified, the emissivity can be obtained from local information or remote databases through telecommunication networks to calculate the temperature accurately.

In another implementation, a 2-by-2, 4-by-4 or n-by-n array camera includes filters that divide the spectrum into 4, 16 or $n^2$ channels. For the example of a 2-by-2-array, a red, green and blue channel, as well as an IR detection channel can be used. When directed at an object of interest, the camera records four images of the same scene with the spectrum divided into the four channels red, green and blue as well as IR information (see FIG. 11). This spectral information can be used to identify the material as described above. The object can be separated from the rest of the scene using standard image processing techniques or using parallax information from the lens array images. Once the material is known, the emissivity information can be combined with the collected thermal information to obtain more accurate temperature information. The lens array is not restricted to a square but can also be, for example, 1-by-4, or 2-by-3, or n-by-m lenses, where n and m differ from one another.

Another way to provide an accurate emissivity is to illuminate scene with a source of known spectral distribution. The emissivity can be calculated from the reflected light, especially if the distance to the object is known. The mobile device can obtain this information from built-in sensors (e.g., a time-of-flight distance measurement or a parallax based measurement) using one or more cameras in the mobile device. The flash of a mobile device equipped with a light source in the visible or IR range also can be used for this purpose. Alternatively, a separate IR flash that emits around 10+/−5 µm can be added to the device.

Other implementations are within the scope of the claims.

What is claimed is:

1. A non-contact thermal sensor module comprising:
   first and second optics substrates on each of which is a respective optical element;
   a sensor package including a thermal sensor;
   a first spacer separating the first optics substrate and the second optics substrate from one another; and
   a second spacer separating the second optics substrate and the sensor package from one another,
   the second spacer, the second optics substrate, the first spacer and the first optics substrate forming a stack over the sensor package in that order,
   the first and second spacers having inner surfaces facing an interior region of the module,
   wherein the first optics substrate is transparent to infra-red radiation,
   wherein the second optics substrate has an aperture substantially aligned with the thermal sensor, and
   wherein the first and second spacers are composed of, or coated with, a low emissivity material having an emissivity of no more than 0.1.

2. The thermal sensor module of claim 1 comprising telescope-type optical elements.

3. The thermal sensor module of claim 1 wherein the optical element on the first optics substrate is a lens that faces the interior region of the module.

4. A non-contact thermal sensor module comprising:
   first and second optics substrates on each of which is a respective optical element;
   a sensor package including a thermal sensor;
   a first spacer separating the first optics substrate and the second optics substrate from one another; and
   a second spacer separating the second optics substrate and the sensor package from one another,
   the first and second spacers having inner surfaces facing an interior region of the module,
   wherein the first optics substrate is transparent to infra-red radiation,
   wherein the second optics substrate has an aperture substantially aligned with the thermal sensor,
   wherein the first and second spacers are composed of, or coated with, a low emissivity material having an emissivity of no more than 0.1,
   wherein the optical element on the first optics substrate faces the interior region of the module, and
   wherein the optical element on the second optics substrate includes a curved, reflective surface facing the optical element on the first optics substrate, and wherein the curved reflective surface is coated with a metal material.

5. The thermal sensor module of claim 1 wherein the low emissivity material is composed of one or more metals selected from a group consisting of copper, aluminum, gold and nickel.

6. The thermal sensor module of claim 1 having a width and height of 5 mm or less.

7. The thermal sensor module of claim 1 having a width and height of 2 mm or less.

8. The thermal sensor module of claim 1 wherein the portion of the optics substrate that is transparent to infra-red radiation has a radius of 0.5 mm or less.

9. The thermal sensor module of claim 1 having an angle of view less than 30°.

10. A non-contact thermal sensor module comprising:
    first and second optics substrates on each of which is a respective optical element;
    a sensor package including a thermal sensor;
    a first spacer separating the first optics substrate and the second optics substrate from one another; and
    a second spacer separating the second optics substrate and the sensor package from one another,
    the first and second spacers having inner surfaces facing an interior region of the module,
    wherein the first optics substrate is transparent to infra-red radiation,
    wherein the second optics substrate has an aperture substantially aligned with the thermal sensor,
    wherein the first and second spacers are composed of, or coated with, a low emissivity material having an emissivity of no more than 0.1, and
    wherein the optical element on the second optics includes a reflective surface operable such that at least some infra-red radiation passing into the module through the first optics substrate is reflected toward the optical element on the first optics substrate, the optical element on the first optics substrate being operable to reflect at least some of that infra-red radiation through the aperture in the second optics substrate toward the thermal sensor.

11. The thermal sensor module of claim 10 wherein the reflective surface is coated with a metal material.

12. The thermal sensor module of claim 10 wherein the reflective surface is covered with a low-emissivity, highly-reflective coating.

13. The thermal sensor module of claim 10 wherein the optical element on the first optics substrate comprises a mirror.

14. The thermal sensor module of claim 4 wherein the optical element on the first optics substrate comprises a mirror.

* * * * *